Figures 1, 2, 3:
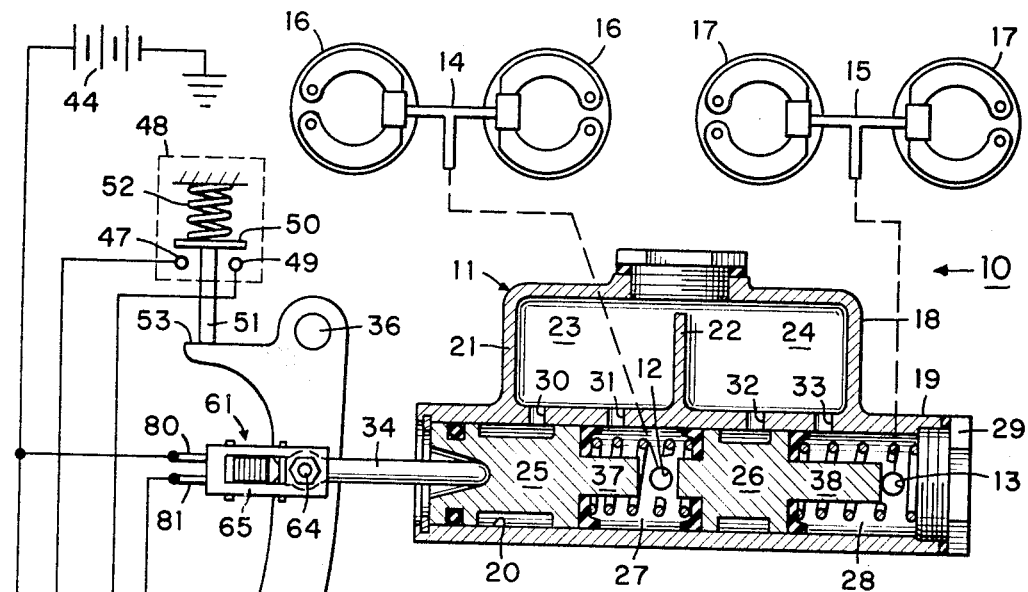

April 15, 1969   R. J. KERSTING   3,439,323
FLUID PRESSURE FAILURE INDICATING MEANS
Filed Oct. 12, 1966

INVENTOR
RAYMOND J. KERSTING
BY William R. O'Meara

United States Patent Office 3,439,323
Patented Apr. 15, 1969

3,439,323
FLUID PRESSURE FAILURE INDICATING MEANS
Raymond J. Kersting, Dellwood, Mo., assignor, by mesne assignments, to Wagner Electric Corporation, South Bend, Ind., a corporation of Delaware
Filed Oct. 12, 1966, Ser. No. 586,133
Int. Cl. B60q 1/44; G08b 21/00
U.S. Cl. 340—52                 9 Claims This invention relates to fluid pressure system failure indicating means and more particularly to circuit means for detecting and indicating the occurrence of a pressure failure in a fluid pressure system.

In fluid pressure systems, for example, in vehicle hydraulic braking systems utilizing a dual master cylinder arrangement, the master cylinders are respectively connected to a pair of fluid pressure branches which respectively supply fluid pressure to the front and rear sets of wheel brakes. In such systems, the set of brakes connected to one branch will be operable even though a fluid pressure failure, such as a break in a fluid pressure line, occurs in the branch connected to the other set of brakes. Should a pressure failure occur in such a system it is, of course, highly desirable to have the failure corrected as soon as possible; however, unless some means are provided to warn the operator, he may continue to operate the vehicle unaware that a pressure failure has occurred.

Fluid pressure responsive devices, such as fluid pressure responsive switches, can be connected in communication with the system pressure fluid to detect the presence of a pressure failure, and such devices are generally reliable; however, they are subject to wear and fatigue which can result in a pressure fluid leak and a fluid pressure failure in a system that otherwise would be operational. Also, fluid pressure responsive devices of this type require fluid pressure fittings or connections for the installations thereof in the system which may also add to the number of possible points in the system where a pressure fluid leak may occur.

It is therefore an object of the present invention to provide novel fluid pressure failure warning means for a fluid pressure system which does not require the use of a fluid pressure responsive device connected in communication with the pressure fluid of the system.

Another object of the invention is to provide novel fluid pressure failure warning means for a fluid pressure system in which normally unenergized signal means is energized upon the occurrence of a fluid pressure failure in the system and wherein the use of fluid pressure responsive devices connected in pressure fluid communication in the system are not required.

Still another object is to provide novel fluid pressure failure warning means which can be used with a fluid pressure system having a plurality of fluid pressure branches supplied fluid pressure substantially simultaneously and independently to provide a signal in the event of a fluid pressure failure in any of the branches and wherein the warning means does not require the use of fluid pressure responsive devices connected in communication with pressure fluid in the system.

These and other objects and advantages of the present invention will become apparent hereinafter.

Briefly, in accordance with one aspect of the present invention, warning means are provided for indicating a fluid pressure failure in a fluid pressure system which includes fluid pressure generating means and means movable to actuate the pressure generating means to establish fluid pressure in the system, the indicating means including a pair of switch means, one of the switch means being actuated in response to a predetermined amount of movement of the movable means, the other switch means being actuated in response to a predetermined amount of reaction force on the movable means, signal means, and circuit means interconnecting said pair of switch means with the signal means and with current supply means to effect energization of the signal means in the event that said other switch means is not actuated when said one switch means is actuated.

In the drawing which illustrates an embodiment of the present invention,

FIG. 1 is a diagrammatic view illustrating a braking system of a vehicle including a dual master cylinder in cross section and a schematic diagram of fluid pressure failure indicating means according to the present invention, FIG. 2 is an enlarged sectional view of a switch utilized in the system of FIG. 1 in one operating condition thereof, and FIG. 3 is an enlarged sectional view of the switch shown in FIGS. 1 and 2 in another operating condition thereof.

Referring now to FIG. 1 of the drawing, a fluid pressure vehicle braking system 10 is shown for illustration which includes a fluid pressure generating dual master cylinder assembly 11 having a pair of outlet ports 12 and 13 respectively connected in a pair of pressure fluid branches 14 and 15. Front and rear sets of wheel brake assemblies 16 and 17 are respectively connected in the branches 14 and 15. The brake assemblies 16 and 17 may be of any suitable construction and are each shown diagrammatically in FIG. 1 as including a hydraulic wheel cylinder and a pair of brake shoes connected to be operated by the wheel cylinder.

Master cylinder assembly 11 is shown as a tandem master cylinder which includes a housing 18 having a master cylinder portion 19 with a through bore 20 and a hydraulic fluid reservoir 21 which is divided by a partition 22 to provide a pair of separate reservoir chambers 23 and 24. A primary pressure generating piston 25 and a secondary pressure generating piston 26 are slidingly disposed in bore 20, each piston having opposed end portions in sealing engagement with the bore to define a primary expansible fluid pressure chamber 27 between the facing end portions of pistons 25 and 26 and a secondary expansible fluid pressure chamber 28 between the right end portion of piston 26 and a closure member or nut 29 threadedly received in the right end portion of the bore 20. Conventionally, suitable passages 30 and 31 extending through the cylinder wall provide the desired pressure fluid communication between reservoir chamber 23 and bore 20 for proper operation of the primary piston 26, and passages 32 and 33 in the cylinder wall provide fluid communication between reservoir 24 and the bore 20 for proper operation of secondary piston 26. An actuating or push rod 34 engages primary piston 25 at one end and is pivotally connected at the opposed end to a manually operated brake pedal 35 pivotally mounted by a pin 36 on the vehicle. An abutment member 37 on primary piston 25 is adapted to engage secondary piston 26 upon excessive movement of piston 25, and an abutment member 38 on secondary piston 26 is adapted to engage the closure member 29 upon excessive movement of piston 26.

Since the operation of tandem master cylinders are well known to those skilled in the art, the operation of tandem master cylinder 11 will only briefly be described herein.

Under normal operating conditions, when the vehicle operator applies a force to depress pedal 35, the applied force is transmitted through rod 34 to move primary piston 25 rightwardly in bore 20 to generate fluid pressure in chamber 27 and supply actuating fluid pressure to the front wheel brakes 16 in branch 14. Substantially simultaneously, the secondary piston 28 is moved rightwardly in bore 20 in response to the fluid pressure in chamber 27 to thereby generate fluid pressure in chamber 28 and supply actuating fluid pressure to the rear brakes 17 in branch 15. Should movement of piston 25 by the applied force fail to actuate front brakes 16, for example, as a result of a break in a hylraulic conduit in branch 14, abutment member 37 will engage and move secondary piston 26 rightwardly to pressurize fluid in chamber 28 and thereby effect energization of the rear set of brakes 17. On the other hand, should rightward movement of piston 26, in response to fluid pressure in chamber 27, fail to actuate the rear brakes 17 due, for example, to a break in a conduit of branch 15, the abutment 38 will engage the nut 29 and fluid in chamber 27 between pistons 25 and 26 will be pressurized to actuate the front brakes 16.

In accordance with the embodiment of the invention illustrated in the drawing, the fluid pressure failure indicating means includes signal means shown as an electric signal lamp 42 for warning the vehicle operator of the occurrence of a pressure failure in the fluid pressure system. Signal lamp 42 is preferably mounted in view of the vehicle operator, for example, on the dash board of the vehicle.

The signal lamp 42 has one side connected to a circuit terminal 43 which is in turn connected to the positive side of a vehicle battery 44 through an ignition switch. The other side of battery 44 is connected to ground, such as the chassis of the vehicle. The other side of lamp 42 is connected to a circuit terminal 45 which, in turn, is connected by a lead 46 to a stationary contact 47 of a switch 48. Switch 48 includes another stationary contact 49, a movable bridging contact 50 and an actuating member 51 adapted to effect movement of contact 50 into engagement with both contacts 47 and 49. The switch 48 is mounted to the vehicle adjacent brake pedal 35 with a spring 52 normally urging the contact 50 and actuating member 51 toward engagement with an abutment 53 on the brake pedal 35. Switch 48 is positioned relative to pedal 35 such that when pedal 35 is in its retracted position, the position shown in FIG. 1, the swtich 48 is open with contact 50 spaced from contacts 47 and 49, and such that the contact 50 is moved into engagement with contacts 47 and 49 to close the switch upon a predetermined amount of movement of pedal 35 in a fluid pressure generating direction from the retracted position. Contact 49 is connected by a lead 54 to a ground terminal 55 through a pair of normally closed contacts 56 and 57 of a relay 58. Lamp 42 is thus connected in series with normally open contacts 47 and 49 and normally closed contacts 56 and 57 between ground terminal 55 and terminal 43.

Relay 58 also includes a relay coil 59 grounded at one end and with the opposite end connected to a terminal 60. When coil 59 is energized, contact 57 moves out of engagement with contact 56.

Connected between terminal 60 and the positive side of battery 44 is a switch 61 which is described in detail hereinafter. A pair of tail lamps 62 are shown connected between ground and terminal 60 and energized by battery 44 whenever switch 61 is actuated or closed.

A hold-on relay 63 having a pair of normally open switch contacts 63a and 63b are connected between terminal 45 and ground. The relay 63 is provided with a relay coil 63c connected in parallel with lamp 42 between terminals 43 and 45 to close contacts 63a and 63b whenever lamp 42 is energized. Contacts 63a and 63b are connected between terminal 45 and ground in parallel or bypassing relation with switch 48 and contacts 56 and 57.

Referring also to FIGS. 2 and 3, the push rod 34 and switch 61 are connected to brake pedal 35 by means of a pin 64 fixed to pedal 35. Switch 61 includes a pair of spaced side plates 65 (FIG. 1) and 66, each provided with a mounting opening 68, only the mounting opening 68 in side plate 66 being shown. The openings 68 are aligned to receive the pin 64. The left end of push rod 34 is disposed between the side plates 65 and 66 and is provided with an opening 69 which also receives the pin 64. The openings 68 in side plates 65 and 66 provide a close fitting relationship with pin 64; however, the opening 69 in rod 34 is predeterminately greater in diameter than pin 64 to provide a predetermined lateral gap 70 between the pin 64 and rod 34. The length of gap 70 corresponds to the amount of relative travel between the pin 64 and rod 34 necessary to effect actuation or closing of switch 61, as will be fully explained hereinafter.

Switch 61 has actuating means including a slidable plate member 72 resiliently urged into engagement with the left end of push rod 34 by a switch actuating plunger 73 and a spring 74. The spring 74 is disposed between a plate 75, that is connected between side plates 65 and 66, and a flange formed on the right end portion of plunger 73. The left end of plunger 73 extends through a central opening in plate 75 and engages a resilient contact member 77 mounted on an insulating member 78 connected to the side plates 65 and 66. The contact member 77 is movable into engagement with a fixed contact 79 mounted to the member 78. External terminals 80 and 81 extend through member 78 and respectively connect with the contacts 77 and 79.

The force of spring 74 is preferably greater than the forces of friction and the springs within the master cylinder 11 so that during initial depression of brake pedal 35 the pin 64 moves the side plates 65 and 66 of switch 61 and movement of push rod 34 is effected by the force of spring 74 acting on plate 72. As fluid pressure increases in the primary chamber 27 and/or secondary chamber 28 upon continued depression of pedal 35, the reaction force acting on rod 34 as a result of the fluid pressure increases and when it becomes greater than the force of spring 74, the pin 64 and pedal 35 move relative to the push rod 34 in a direction to close the gap 70 and, at the same time, plunger 73 moves leftwardly relative to side plates 65 and 66 against the force of spring 74 to close contacts 77 and 79. FIG. 3 shows the contacts 77 and 79 in the closed condition and with the pin 64 in direct force transmitting engagement with the push rod 34. Thereafter, further force applied to pedal 35 is transmitted to push rod 34 directly through pin 64.

The switch 48, which is actuated in response to a predetermined amount of travel, and switch 61, which is actuated in response to a predetermined reaction force acting on rod 34, are correlated so that switch 61 is actuated before the pedal 35 has travelled the predetermined distance necessary to actuate or close switch 48 under normal operating conditions of the system. Thus, under normal operating conditions of the braking system, switch 61 will close its contacts 77 and 79 so that current flows from the positive side of battery 44 through closed switch 61 to terminal 60 and thence through relay coil 59 to ground thereby energizing coil 59 and opening switch contacts 56 and 57 before contacts 47 and 49 of switch 48 are closed. Since contacts 56 and 57 are opened before switch 48 closes its contacts 47 and 49, the subsequent closing of switch 48 does not effect energization of signal lamp 42 since the lamp 42 has no current path to ground.

Should a fluid pressure failure occur in branch 14 due, for example, to a break in a conduit thereof, depression of brake pedal 35 will move primary piston 25 an excessive amount as it moves into engagement with secondary piston 26, and then piston 26 moves to pressurize fluid in chamber 28 to actuate brakes 17. Pedal 35 will thus travel farther than under normal operating conditions before there is sufficient reaction force created on rod 34 to effect actuation of switch 61. Thus, under these conditions, the actuating member 51 of switch 48 will travel the predetermined distance necessary to close or interconnect contacts 47 and 49 before switch 61 is closed and lamp 42 is energized because contacts 56 and 57 of relay 58 are closed and provide a ground return for lamp 42. Lamp 42 is energized by current flow from the positive side of battery 44 and through terminal 43, through lamp 42, lead 46, closed contacts 47, 49 and 50 of switch 48, lead 54, contacts 56 and 57 of relay 58, and ground terminal 55 to the other side of battery 44. The hold-on relay coil 63c is energized when lamp 42 is energized so that relay contact 63a moves into engagement with contact 63b to connect terminal 45 to ground and maintain the coil 63c and lamp 42 energized even after switch 61 actuates relay 58 to its open condition. The lamp 42 will remain on after the pedal is released to warn the vehicle operator that a pressure failure has occurred and that only one set of brakes is operational.

Similarly, should a fluid pressure failure occur in branch 15 due, for example, to a break in a conduit thereof, depression of brake pedal 35 will effect movement of secondary piston 26 into engagement with closure member 29 before effective fluid pressure is generated in primary chamber 27. Thus, the brake pedal movement will be greater than under normal operating conditions and switch 48 will close before the predetermined amount of reaction force is created on rod 34 to close or actuate switch 61. Thus, lamp 42 will be energized through switch 48 and closed contacts 56 and 57 of relay 58. Hold-on relay 63c will also be energized to close its contacts 63a and 63b to maintain the lamp 42 energized after switch 61 is actuated, as well as after the pedal 35 is returned to its retracted position.

It will be apparent that the fluid pressure indicating means shown in the drawing does not require any hydraulic pressure responsive devices or switches connected in fluid pressure communication with the pressure chambers 27 and 28 or in conduits of branches 14 and 15.

The embodiments of the invention in which an exclusive property or privilege is claimed are defined as follows:

1. Warning means for a fluid pressure system including fluid pressure controlled means, fluid pressure generating means connected to said fluid pressure controlled means, and means movable in response to an applied force to actuate said fluid pressure generating means to establish fluid pressure in said system for actuating said fluid pressure controlled means, the established fluid pressure creating a reaction force on said movable means in opposition to said applied force, said warning means comprising first switch means connected with said movable means and actuated in response to a predetermined amount of movement thereof, second switch means connected with said movable means and actuated in response to a predetermined reaction force on said movable means, current supply means, signal means, and circuit means interconnecting said current supply means, signal means, and first and second switch means to effect energization of said signal means in response to actuation of said first switch means in the event said first switch means are actuated before said second switch means are actuated.

2. The warning means according to claim 1 wherein said circuit means includes normally closed switch contact means connected in series with said first switch means and said signal means, switch control means for opening said contact means in response to the energization thereof, and means connecting said control means with said second switch means to effect energization of said control means in response to actuation of said second switch means.

3. The warning means according to claim 1 including hold-on means connected with said signal means and energized in response to the energization of said signal means to connect said signal means to said supply means in by-passing relation to said first switch means.

4. The warning means according to claim 3 wherein said signal means comprises an electric lamp.

5. In combination, a fluid pressure system including fluid pressure controlled means, fluid pressure generating means connected to said controlled means, means movable in response to an applied force thereon to actuate said fluid pressure generating means to establish fluid pressure in said system for actuating said controlled means, the established fluid pressure in said system creating a reaction force on said movable means in opposition to the applied force, operator means for applying an applied force to said movable means in response to an applied force thereon, means connecting said movable means with said operator means to provide concerted movement thereof and a predetermined amount of relative movement therebetween, first switch means connected to said operator means for concerted movement therewith, said switch means including switch contact means, and resiliently urged actuating means for actuating said switch contact means between first and second switch positions, said actuating means engaging said movable means to resiliently oppose the relative movement between said said operator and movable means, said operator and movable means being relatively movable in response to the reaction force on said movable means in excess of a predetermined amount to overcome the force of said actuating means and effect actuation of said contact means from said first switch position to said second switch position, second switch means connected with said operator means and actuated in response to a predetermined amount of movement of said operator means, signal means, third switch means, means connecting said signal means and said second and third switch means in series circuit relationship between a pair of circuit terminals, voltage supply means connected across said terminals for effecting energization of said signal means, and switch control means connected with said first switch means for actuating said third switch means in response to actuation of said first switch means, said second switch means effecting energization of said signal means when actuated before the actuation of said third switch means.

6. The combination according to claim 5 wherein said first switch means include normally open contact means which are closed in response to the actuation thereof, said second switch means include normally open contact means which are closed in response to the actuation thereof, and said third switch means include normally closed contact means opened in response to the actuation of said first switch means.

7. The combination according to claim 6 including a hold-on relay having normally open switch contact means connected in parallel circuit relationship with said second and third switch means and including a control coil connected with said signal means and energized in response to the energization of said signal means to close said last named contact means to connect said signal means with said supply means in by-passing relation with said second and third switch means.

8. Warning means for a dual fluid pressure system including a pair of fluid pressure branches, fluid pressure generating means respectively connected to said branches, means movable in response to an applied force to actuate said generating means to establish fluid pressure in said branches substantially simultaneously and independently, the established fluid pressure in one of said branches creating a reaction force on said movable means in opposition to said applied force, operator means for applying an applied force to said movable means, means connecting said operator means to said movable means to effect concerted movement thereof and a predetermined amount of relative movement therebetween, first switch means connected with said operator means for concerted movement therewith and including resiliently urged switch actuating means connected with said movable means and opposing relative movement between said operator and movable means, said operator and movable means being relatively movable in response to a predetermined amount of reaction force on said movable means to actuate said first switch means, second switch means connected with said operator means and actuated in response to a predetermined amount of movement of said operator means, said fluid pressure generating means normally establishing fluid pressure in said branches to effect said predetermined amount of reaction force on said movable means to actuate said first switch means before said operator means has moved said predetermined amount to effect actuation of said second switch means, a series circuit including current supply means, electric signal means, and said second switch means, and circuit means connected with and responsive to the actuation of said first switch means to open-circuit said series circuit to prevent energization of said signal means when said first switch means is actuated before the actuation of said second switch means.

9. The combination according to claim 8 including hold-on relay means including switch contact means and control coil means for actuating said contact means from one switch condition to another, said control coil means being connected with and energized in response to the energization of said signal means to actuate said contact means, said contact means being connected to supply current from said supply source to said signal means and said control coil upon actuation thereof and in by-passing relation with said second switch means.

References Cited
UNITED STATES PATENTS

| | | | |
|---|---|---|---|
| 2,734,960 | 2/1956 | Reynolds | 200—82.3 |
| 2,840,795 | 6/1958 | Gee | 340—63 |
| 3,115,559 | 12/1963 | Cass et al. | 200—61.89 |

JOHN W. CALDWELL, *Primary Examiner.*

H. COHEN, *Assistant Examiner.*

U.S. Cl. X.R.

200—153.3, 153.82; 340—69, 240